Figure 1:
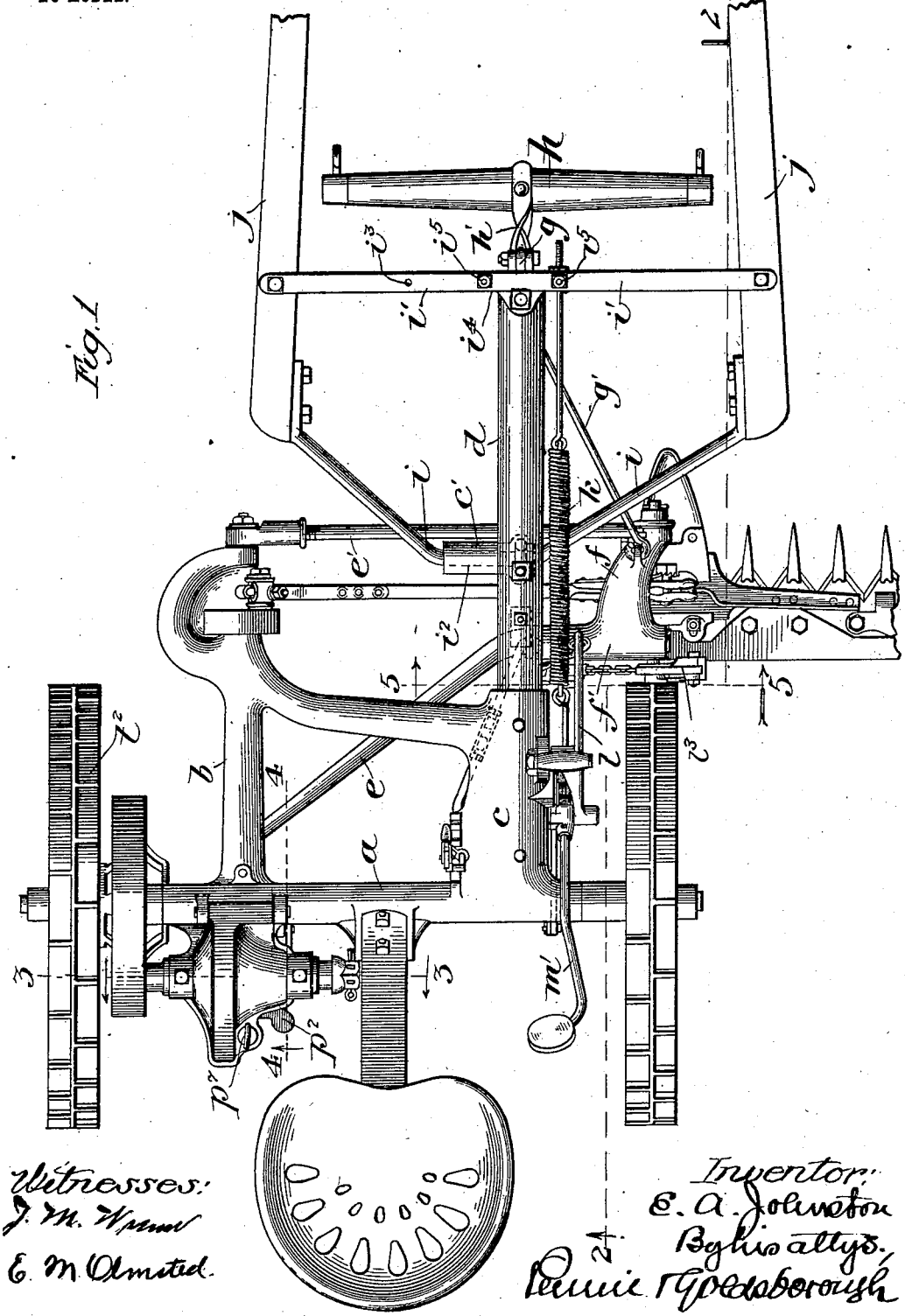

No. 728,580. PATENTED MAY 19, 1903.
E. A. JOHNSTON.
MOWING MACHINE.
APPLICATION FILED FEB. 27, 1902.
NO MODEL. 6 SHEETS—SHEET 1.

Witnesses:
J. M. Wynn
E. M. Olmsted.

Inventor:
E. A. Johnston
By his attys.

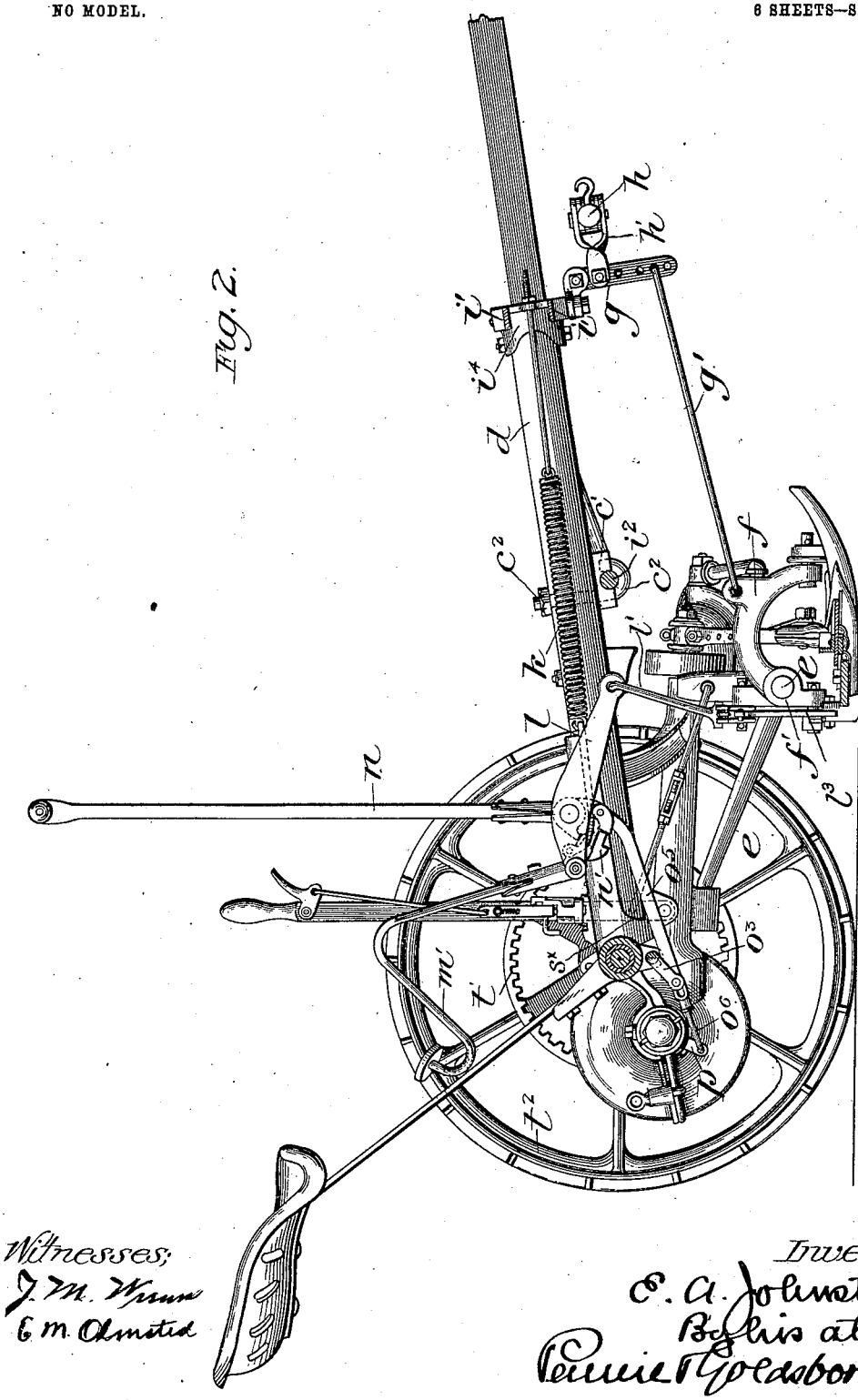

No. 728,580. PATENTED MAY 19, 1903.
E. A. JOHNSTON.
MOWING MACHINE.
APPLICATION FILED FEB. 27, 1902.
NO MODEL. 6 SHEETS—SHEET 3.
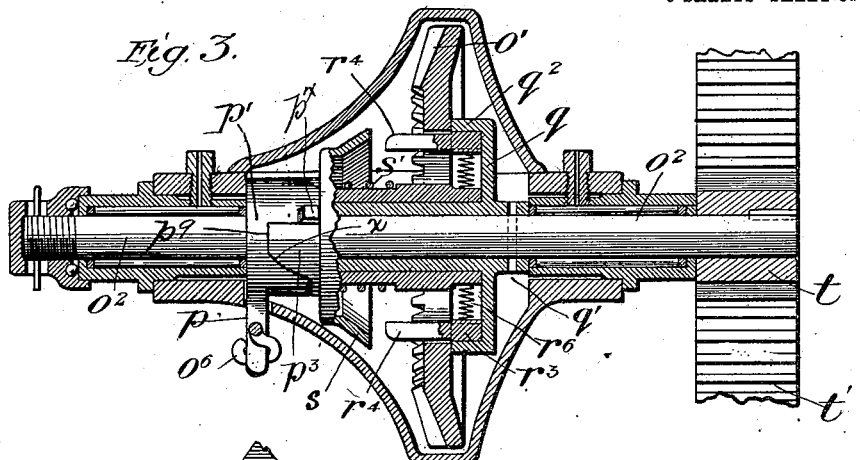
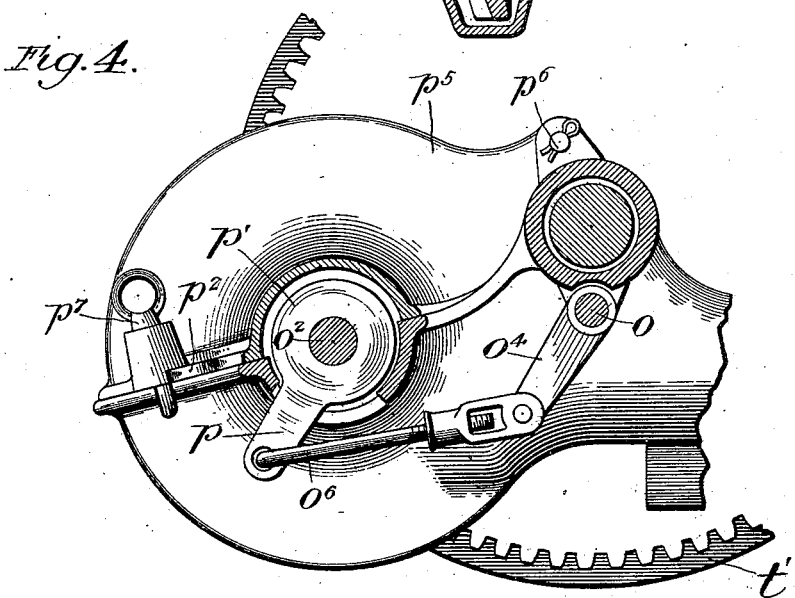
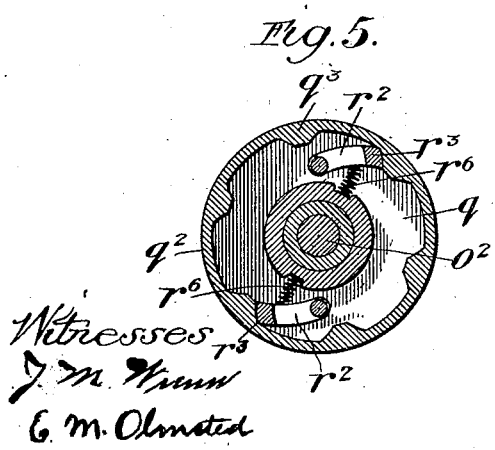
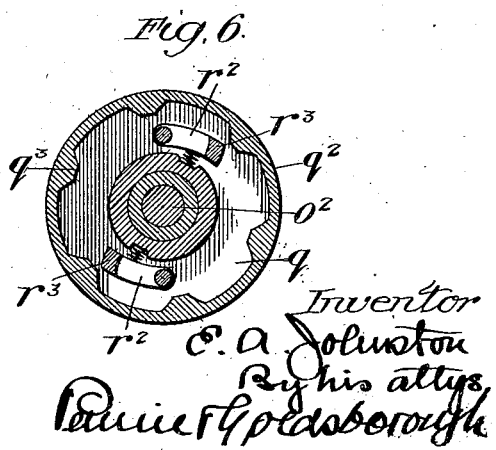

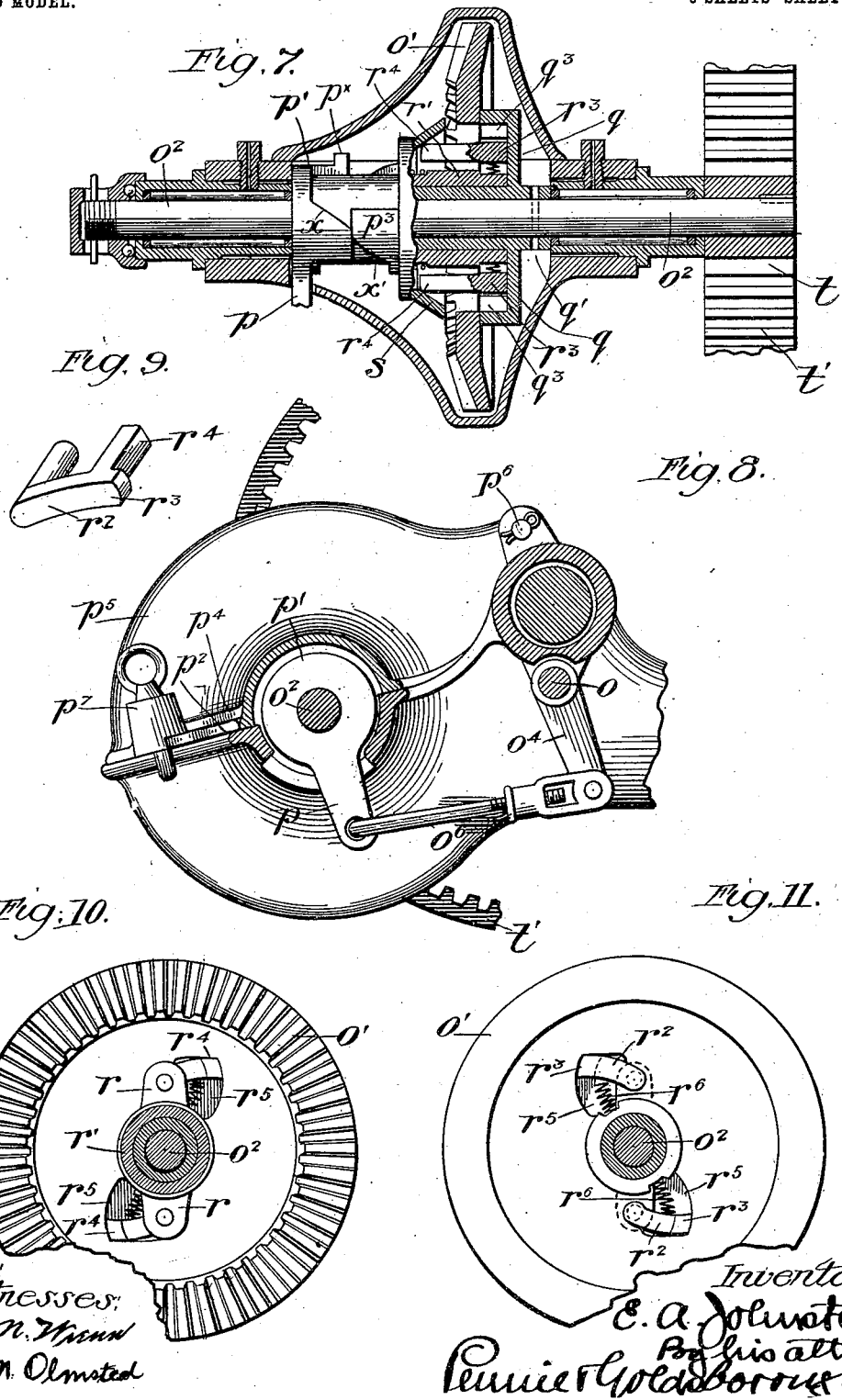

No. 728,580. PATENTED MAY 19, 1903.
E. A. JOHNSTON.
MOWING MACHINE.
APPLICATION FILED FEB. 27, 1902.
NO MODEL. 6 SHEETS—SHEET 5.
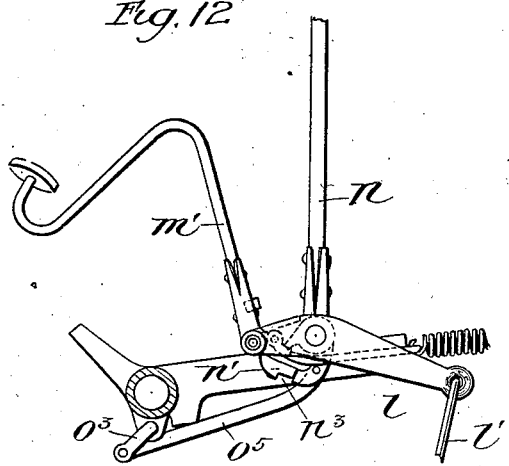
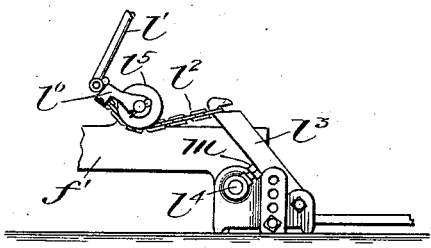
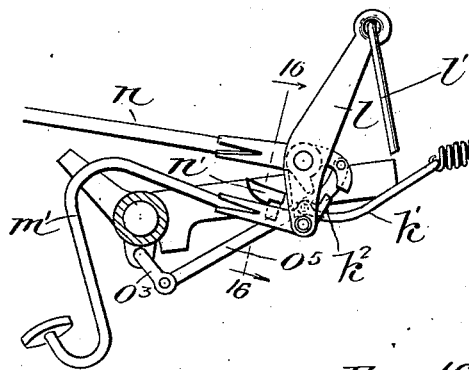
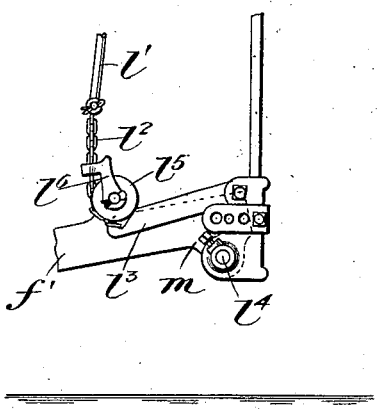
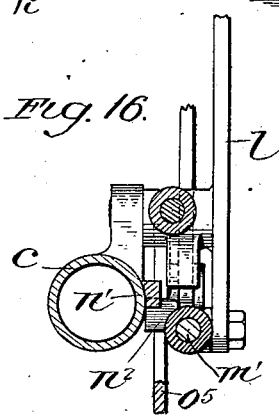
Witnesses:
J. M. Hunn
C. M. Olmsted
Inventor
E. A. Johnston
By his attys.
Pennie & Goldsborough No. 728,580. PATENTED MAY 19, 1903.
E. A. JOHNSTON.
MOWING MACHINE.
APPLICATION FILED FEB. 27, 1902.
NO MODEL. 6 SHEETS—SHEET 6.
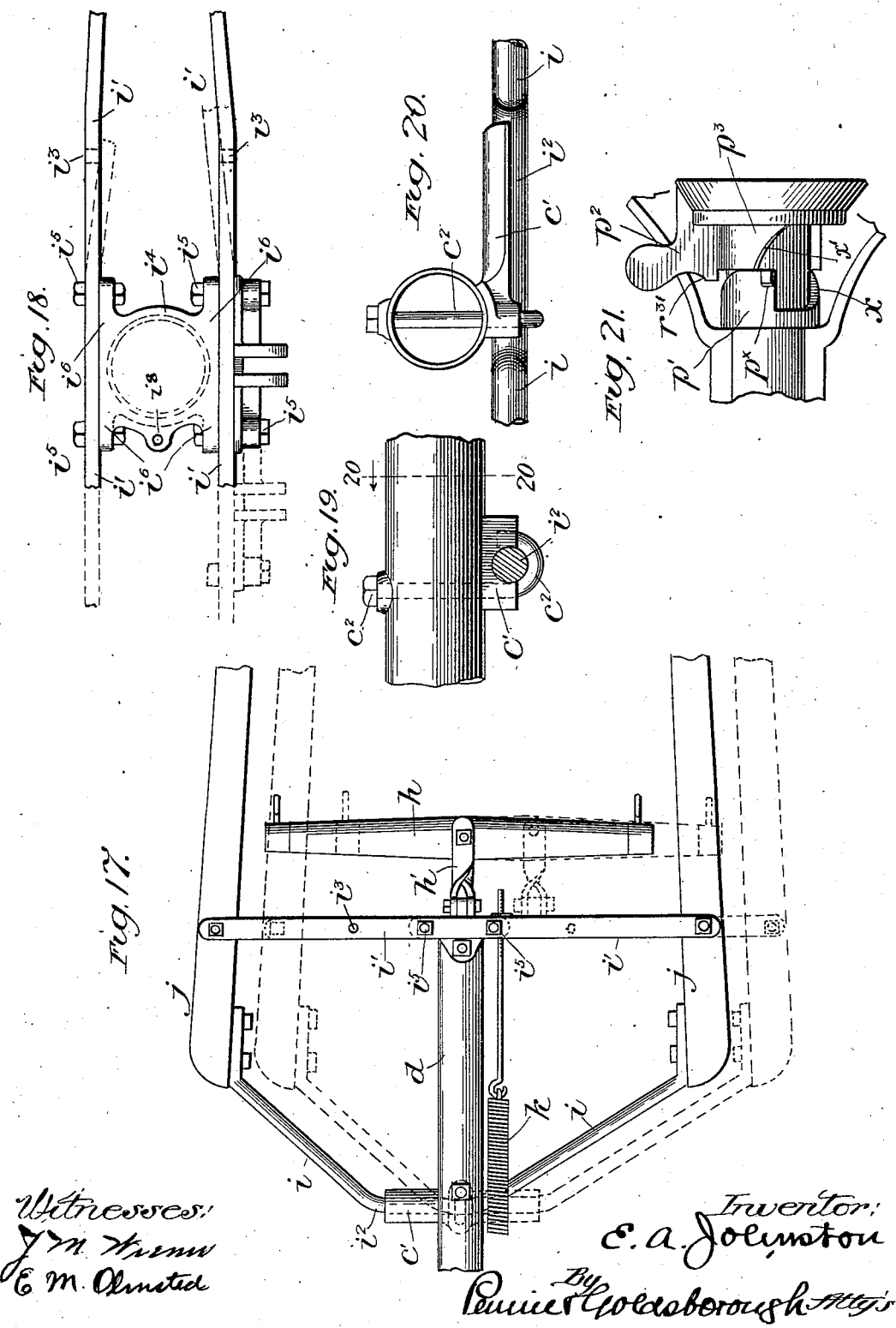

No. 728,580.

Patented May 19, 1903.

UNITED STATES PATENT OFFICE.

EDWARD A. JOHNSTON, OF CHICAGO, ILLINOIS, ASSIGNOR TO McCORMICK HARVESTING MACHINE COMPANY, OF CHICAGO, ILLINOIS.

MOWING-MACHINE.

SPECIFICATION forming part of Letters Patent No. 728,580, dated May 19, 1903.

Application filed February 27, 1902. Serial No. 95,862. (No model.)

*To all whom it may concern:*

Be it known that I, EDWARD A. JOHNSTON, a citizen of the United States, residing at Chicago, county of Cook, and State of Illinois, have invented certain new and useful Improvements in Mowing-Machines; and I do hereby declare the following to be a full, clear, and exact description of the invention, such as will enable others skilled in the art to which it appertains to make and use the same.

The object of the invention is to improve the construction of these machines, more especially in the matter of the means employed for controlling the cutting apparatus and throwing it up out of operation and locking it in vertical position; also, the connections between the lever for throwing the cutting apparatus into vertical position and a clutch-shipper in the train of gearing between the main driving-gear and the cutter crank-shaft whereby the rotation of the crank-shaft is discontinued when the cutting apparatus is thrown up out of operation; also, the construction of coupling-frame whereby the cutting apparatus is hinge-jointed to the main frame and the connection of the inner shoe to this frame, and, finally, the draft devices whereby the machine is more particularly designed to be drawn by a single animal.

The several features of improvement are herein illustrated in a machine adapted only for one horse; but, excepting only in respect of the draft devices, these features are applicable to any type or construction of machine.

The invention is illustrated in the accompanying drawings, forming a part of this specification, wherein—

Figure 1 is a plan view of the entire machine except a portion of the cutting apparatus and shafts. Fig. 2 is a section on the line 2 2 of Fig. 1. Fig. 3 is a section on the line 3 3 of Fig. 1 looking rearward. Fig. 4 is a section on the line 4 4 of Fig. 1 looking stubleward. Figs. 5 and 6 are detail sectional views of the clutch-disk. Fig. 7 is a sectional view similar in all respects to Fig. 3 except that the crank-shaft drive-gear is shown unclutched from the counter-shaft. Fig. 8 is a sectional view similar to Fig. 4 except that the clutch-shipping connections are shown in the position corresponding to the position of parts in Fig. 7. Fig. 9 is a detail perspective view of one of the clutch-pawls. Figs. 10 and 11 are opposite face views of the gear that drives the cutter crank-shaft. Figs. 12 and 14 are detail views of the levers for counterbalancing and throwing the cutting apparatus up out of operation. Figs. 13 and 15 are detail views on the line 5 5, Fig. 1, of the connections between the compensating lever and the cutting apparatus whereby the latter is controlled and lifted vertically. Fig. 16 is a sectional view on the line 16 16 of Fig. 14, intended to more clearly illustrate the arrangement for locking the lifting-levers when the cutting apparatus is elevated. Fig. 17 is a detail plan of the means for attaching the shafts. Fig. 18 is a detail of the manner of attaching and adjusting the strap-irons of the shafts. Fig. 19 is a detail side view of the means for attaching the shaft-iron to the stub-tongue. Fig. 20 is a section on the line 20 20, Fig. 19; and Fig. 21 is a detail plan of the clutch-shipper.

In the parts hereinafter described and claimed the machine may be of any usual or preferred construction. The main frame $a$, which, as usual, is sleeved upon the axle, has in addition to the crank-shaft housing $b$ ordinarily employed a forward extension $c$, that is preferably formed at the rear with a socket $s^\times$, as shown in Fig. 2, into which is seated the rear end of a stub-tongue $d$, which is preferably made tubular and is rigidly secured in the extension $c$.

The coupling-frame is formed of two bars $e\ e'$ and an arched yoke $f$. One of these bars, $e$, is pivoted, as usual, to the under side of the crank-shaft housing and extends diagonally forward and grassward to a point about in the plane of the stub-tongue, where its end is deflected laterally into a line with the cutting apparatus and at right angles to the line of draft. The other bar, $e'$, is pivotally connected to the front end of the crank-shaft housing and extends laterally in a straight line in a vertical plane parallel with the deflected end of the diagonal bar. The inner shoe is hinge-jointed to the arched yoke $f$, as shown in Figs. 1 and 2, and the yoke is provided at its rear end with a tubular boss $f'$, extending in line with the cutting apparatus and by means of which the yoke is sleeved upon the bent end of the diagonal bar e of the coupling-frame.

At the front end of the stub-tongue there is pivoted a draft-lever g, and from the lower end of this lever a link or rod g' extends diagonally rearward and connects with the yoke f, so that the draft on the lever g tends to lift the front end of the yoke and the inner shoe and prevents the guards from digging into the ground and assists in elevating them and the shoe out of depressions. A singletree h is connected to the lever g near its upper end through the intermediacy of a clevis h' or other connection, and the connections of the tree and the link g' with the lever are both preferably made adjustable, so as to vary the above-described effect of the draft on the cutting apparatus.

Secured to the lower side of the stub-tongue, at a point about midway of its length and projecting on opposite sides thereof diagonally forward, is a shaft-iron i, and at the front end of the tongue a pair of strap-irons i' i' are attached to a bracket $i^4$, that is rigidly secured to the tongue at that point, these strap-irons forming a truss and extending from one shaft j to the other and serving to bind them together securely and fasten them to the forward end of the tongue. This arrangement locates the team directly in line with the tongue; but as it is sometimes desirable to shift the team's position to the right, so that the horse may walk immediately in front of or near the line of travel of the inner wheel and shoe and not trample the swath, the shaft-iron i has a reach $i^2$, extending from about the center of its length sidewise in a straight line for a short distance, as shown in Fig. 1, and the strap-irons i' i' are adjustably secured to the bracket $i^4$ by removable bolts $i^5$ $i^5$, that pass through ears or lugs $i^6$ $i^6$, projecting from the sides of the bracket.

The straight reach of the shaft-iron i is secured to the tongue by means of a detachable and reversible bracket c', that is shaped to fit the under side of the tongue and has a groove on its under side through which the reach $i^2$ passes. The bracket is secured to the tongue by means of a hook-bolt $c^2$, which passes through it and is bolted through to the upper side of the tongue, so that the bracket projects from one side, as shown in the drawings. The shaft-iron passes through the hook of this bolt, and the shaft-iron and its bracket are thus secured to the tongue by one and the same means.

As shown in Figs. 1 and 17, the strap-irons i' i' are provided on the left side of the tongue with additional bolt-holes $i^3$ $i^3$, which are so located that the irons may be detached and moved over toward the right and secured in the new position to the bracket $i^4$ by the same bolts $i^5$ $i^5$.

When it is desired to change the position of the shafts, the bracket c' is detached and turned around so as to extend from the right-hand side of the tongue, as shown in dotted lines in Fig. 17, instead of the left-hand side, as shown in full lines in Figs. 1 and 17, and the whole draft appliance is shifted over into a line with the inner shoe.

Referring now more particularly to Fig. 2, k denotes a spring for counterbalancing the weight of the cutting apparatus. It is adjustably connected at its front end to the bracket $i^4$ at the point $i^3$, and at its rear end it is connected, through the intermediacy of a foot lifting-lever, which will be hereinafter described, to the rear and shorter end of a compensating lever l for equalizing the effect of the spring, which lever is pivoted on the main frame and connected by a link l' and chain $l^2$ to a post or standard $l^3$, that is pivoted at its lower end to some part of the cutting apparatus outside of the hinge-joint $l^4$ between the shoe and the yoke f. On its way from the link l' to the post $l^3$ the chain passes under a sheave or roller $l^5$, journaled on the tubular boss f' of the yoke f, in connection with which sheave there is a small pivoted latch-lever, against the upper end of which the lower end of the link l' contacts to change the leverage of the link l'. As the link engages this lever it is thrown out from the center of the sheave $l^5$, while the chain underneath the sheave maintains the same relation with its axis. The object of this arrangement is to give the link l' an increased leverage and raise the outer end of the finger-bar slightly before the inner shoe is lifted off the ground. When, however, the latch-lever swings up into the position shown in Fig. 15, the sheave then simply serves to change the direction of the lifting-chain, and the inner and outer ends of the finger-bar come up together.

As thus far described there is no particular novelty herein claimed for this part of the mechanism for controlling and throwing up the cutting apparatus; but for the purpose of adjusting the gag-stop and varying the amount of drop to the outer end of the cutting apparatus I provide an adjustable set-screw or other stop m on the shoe inward of the pivot of the post $l^3$ and against which the post contacts and upon which it fulcrums when the chain $l^2$ is drawn on for the purpose of lifting the cutting apparatus as well as when the weight of the cutting apparatus is thrown upon the chain by the outer end falling below the level of the shoe, thereby altering the inclination of the post and in effect lengthening and shortening the chain, according as the stop is adjusted in or out.

As hereinbefore described, a foot lifting-lever m' is pivoted to the rear and shorter arm of the compensating lever l. A hand lifting-lever n is also connected with the compensating lever and is pivoted on the main frame coaxially therewith. No particular novelty is claimed herein for the construction, arrangement, or manner of connecting these levers with each other or with the compensating lever, excepting that I provide the following means for locking the levers in position when the cutting apparatus has been thrown up into vertical position out of operation. On the extension $c$ of the main frame and in appropriate juxtaposition to the pivot of the compensating lever there is formed a lug $n'$, which projects laterally from the side thereof toward the foot lifting-lever and has a notch $n^3$ in its under side. When the hand-lever is drawn upon for the purpose of lifting the cutting apparatus, the foot-lever goes down with the rear end of the compensating lever and a projection $n^2$ on the side of the foot-lever slips under the lug $n'$ on the machine-frame and catches in the notch. This forms an effectual lock to hold the compensating lever in the position it assumes when the cutting apparatus is raised into vertical position, as the weight of the cutter-bar tends to raise the rear end of the compensating lever and carry the foot-lever upward with it, and as the spring $k$ is connected by a link $k'$ to a short arm $k^2$ of the foot-lever that projects forward of the pivot the spring pulls on the lever and prevents the lug $n^2$ from becoming accidentally disengaged from the notch in the lug $n'$.

Referring now to Figs. 2 to 11, $o$ denotes a rock-shaft which is journaled in lugs projecting from the under side of the main frame and extends laterally across the machine from about the vertical plane of the hand-lever $n$ to near the crank-shaft driving-gear $o'$ on the counter-shaft $o^2$. At its opposite ends this shaft has crank-arms $o^3 o^4$, the former of which is connected, by means of a link $o^5$, with the lower end of the hand-lever $n$ below its pivot and the latter of which is connected, by means of an adjustable link $o^6$, with a crank-arm $p$, projecting from a cam-hub $p'$, which is journaled on the counter-shaft and forms the rotary part of a clutch-shipper, the other part $p^3$ of which is also sleeved upon the counter-shaft and slides thereon, but is prevented from rotation by means of thumb-piece or handle $p^2$, projecting radially from it, as shown in Fig. 21, and fitting in a notch $p^4$ in the edge of the cover $p^5$ of the gear-case, which is hinged at $p^6$ and incloses the clutch and the crank-shaft drive-gear $o'$ in the usual way. The notch $p^4$ is conveniently formed by slightly cutting away the edge of the cover $p^5$ of the gear-case to one side of the latch $p^7$, or it might be formed in the edge of the gear-case itself, the only requirement being that there should be a slot or space between the two parts when the lid is closed that will receive the handle $p^2$ and permit it to slide as the part $p^3$ of the shipper is moved along the shaft by the rotation of the part $p'$. The cam-hub $p'$ of the shipper is prevented by the end of the gear-casing from sliding on the counter-shaft, and it is notched, as shown at $p^9$, and has one or more inclined surfaces $x$, which coöperate with similar surfaces $x'$ on the sliding part $p^3$ of the shipper, which is also notched in the same way and serves to push the latter toward the clutch when the arm $p$ is rotated forward by pulling the hand-lever backward in the act of lifting the cutting apparatus into vertical position. As shown in Figs. 7 and 21, the rotary part $p'$ of the shipper is provided with a lug $p^\times$, which stands in the path of a similar projection $r^{31}$ on the sliding part $p^3$. The purpose of this arrangement is to prevent the rotary part from being turned so far around by hand that the succeeding notches will be engaged, which would prevent the ready return of the part $p^3$ to its normal position. This arrangement provides for the automatic unclutching of the wheel $o'$ from the shaft $o^2$ whenever the finger-bar is raised into vertical position by the hand-lever, and the location of the handle $p^2$ in the notch $p^4$ in the cover of the casing provides for the unclutching of the wheel at other times by simply raising the casing-cover $p^5$ and turning the sliding part $p^3$ of the shipper around by means of the handle $p^2$, the inclined surface $x$ of the other part being at this time stationary, but serving to push the part $p^3$ toward the wheel $o'$ until its flared rim $s$ engages the ends $r^4$ of the dogs and releases them.

So far as the present improvements are concerned any preferred form of clutch for connecting and disconnecting the outer cutter crank-shaft with its driving mechanism may be employed. I prefer, however, the form illustrated herein, which consists of a disk $q$, which is rigidly connected to the counter-shaft by means of a pin $q'$ or otherwise and has a peripheral rim $q^2$ projecting toward the plain side of the crank-shaft driving-gear $o'$. This rim is provided on its inner surface with teeth or projections $q^3$, and in lugs $r$, projecting at diametrically opposite points from the hub $r'$ on the toothed side of the driving-gear $o'$, are pivoted clutch-dogs $r^2$, projecting through openings $r^5$ in the web of the gear and having teeth $r^3$ extending into the rim of the clutch-disk and normally pressed into engagement with the teeth $q^3$ thereof by means of springs $r^6$. The outer ends $r^3$ of these dogs are projected on the toothed side of the gear $o'$ sufficiently, as at $r^4$, to be engaged by a flaring or outwardly-inclined rim $s$ on the sliding part $p^3$ of the clutch-shipper, so that when the latter is thrust toward the gear $o'$ by the rotary part of the shipper the dogs will be thrown inwardly toward the center of the clutch-disk $q$ against the tension of the springs and will be disconnected from the teeth $q^3$, thereby unclutching the gear $o'$ from the counter-shaft. The sliding part $p^3$ of the clutch-shipper is normally pressed away from the toothed face of the gear $o'$ by means of a spring $s'$; but when the rotary part of the shipper is rocked in the act of lifting the cutting apparatus the sliding part $p^3$ compresses the spring $s'$ and its flaring rim engages the pins $r^4$ of the clutch-dogs in the manner above described.

The counter-shaft $o^2$ has a pinion $t$ on its outer end which engages with the large driving-gear $t'$, which is clutch-connected to the outer supporting-wheel $t^2$ of the machine, as usual, and the shaft and the clutch-disk $q$ are driven when the machine is in motion. The gear $o'$, however, and consequently the cutting crank-shaft, is disconnected from the counter-shaft by the means above described whenever the hand-lever is operated to lift the cutting apparatus into vertical position.

Having thus described my invention, what I claim is—

1. In a one-horse mower, the combination with the main frame, of a stub-tongue rigidly secured to the frame, a pair of shafts, a shaft-iron connecting their rear ends, strap-irons connecting the shafts together at the front end of the tongue, a bracket reversibly secured to the tongue and serving to secure the shaft-iron to the tongue in different positions, and laterally-adjustable connections between the strap-irons and the front end of the tongue.

2. In a one-horse mower, the combination with the main frame, of a stub-tongue rigidly secured thereto, a bracket $c'$ reversibly attached to the tongue, a pair of shafts, a shaft-iron connecting their rear ends and having its middle portion $i^2$ secured to the tongue by the bracket, strap-irons $i'$ connecting the shafts together at the front end of the tongue, and laterally-adjustable connections between the strap-irons and the front end of the tongue.

3. In a mower, the combination with the main frame, and cutting apparatus, of a coupling-frame consisting of a diagonal bar projecting from the rear part of the frame forward and having its front end deflected into a line at right angles to the line of the draft, and a transverse bar projecting from the front part of the frame parallel with the deflected end of the diagonal bar, and a yoke to which the inner shoe is hinge-jointed, said yoke being sleeved at its rear end on the deflected end of the diagonal bar and connected at its forward end to the transverse bar.

4. In a mower, the combination with the cutting apparatus, the counter-shaft, the cutter crank-shaft, the hand lifting-lever, and connections between the lever and the cutting apparatus whereby it may be raised into vertical position, of a transverse rock-shaft journaled in bearings on the frame under the axle, and having cranks at opposite ends, a link connection between the lower end of the lifting-lever and one of the cranks of the shaft, a clutch-shipper journaled on the counter-shaft, and a link connection between the other crank on the shaft and the shipper.

5. In a mower, the combination with the cutting apparatus, the counter-shaft, the cutter crank-shaft, a clutch between the counter-shaft and the crank-shaft driving-gear, a gear-case having a removable cover, a clutch-shipper consisting of a rotary part having a cam-shaped hub and a part sliding on the counter-shaft and having a correspondingly-shaped hub and a flaring rim to engage and release the clutch-pawls, the sliding part of the shipper having a projection or handle which plays in a notch between the gear-case and cover, whereby when the cover is closed the sliding part of the shipper will be held against rotation, but when the cover is opened said part may be rotated so as to release the clutch by hand.

6. In a mower, the combination with the main and coupling frames, the cutting apparatus, and a spring for counterbalancing the cutting apparatus, of a compensating lever for equalizing the effect of the spring, a foot lifting-lever pivoted on the compensating lever and connected to the spring, and a lug on the main frame under which the foot-lever catches to form a lock when the front end of the compensating lever is raised.

7. In a mower, the combination with the main and coupling frames, the cutting apparatus, the spring for counterbalancing the weight of the cutting apparatus, and the compensating lever for equalizing the effect of the spring, of a hand lifting-lever pivoted coaxially with the compensating lever, a foot lifting-lever pivoted to the rear end of the compensating lever, a lug on the foot-lever, and a lug on the main frame under which the foot-lever lug catches to form a lock when the front end of the compensating lever is raised.

8. In a mower, the combination with the main and coupling frames, the cutting apparatus, the spring for counterbalancing the weight of the cutting apparatus, a compensating lever for equalizing the effect of the spring, a foot lifting-lever pivoted to the rear end of the compensating lever so as to turn in an upward direction only, the counterbalancing-spring being connected at one end to the main frame and at the other end to the foot-lever, a lug on the side of the foot-lever, and a lug on the main frame, said main-frame lug being located so that the foot-lever lug catches under it to form a lock when the front end of the compensating lever is raised.

In testimony whereof I affix my signature in presence of two witnesses.

EDWARD A. JOHNSTON.

Witnesses:
CHAS. N. CHAMBERS,
WILLIAM WEBBER.